United States Patent
Le et al.

(10) Patent No.: US 6,452,951 B1
(45) Date of Patent: *Sep. 17, 2002

(54) APPARATUS AND METHOD OF PROCESSING SIGNALING BITS OF INTEGRATED SERVICES DIGITAL NETWORK SIGNALS

(75) Inventors: Phu Son Le; Ajaib S. Bhadare, both of Rohnert Park; Lac X. Trinh, Petaluma, all of CA (US)

(73) Assignee: Alcatel USA Sourcing, L.P., Plano, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/775,131

(22) Filed: Dec. 31, 1996

(Under 37 CFR 1.47)

Related U.S. Application Data

(60) Provisional application No. 60/032,064, filed on Nov. 29, 1996.

(51) Int. Cl.[7] ................................................. H04J 3/22
(52) U.S. Cl. ........................................ 370/524; 370/476
(58) Field of Search .............................. 370/522, 524, 370/466, 384, 467, 264, 410, 474, 476

(56) References Cited

U.S. PATENT DOCUMENTS

| | | | |
|---|---|---|---|
| 4,592,048 A | * 5/1986 | Beckner et al. | 370/354 |
| 4,592,924 A | * 6/1986 | Beckner et al. | 370/354 |
| 5,157,656 A | * 10/1992 | Turudic et al. | 370/379 |
| 5,260,937 A | * 11/1993 | Eames et al. | 370/354 |
| 5,412,657 A | * 5/1995 | Bottiglieri et al. | 370/354 |
| 5,467,353 A | * 11/1995 | Fukuda | 370/110.1 |
| 5,521,924 A | * 5/1996 | Kakuma et al. | 370/466 |

FOREIGN PATENT DOCUMENTS

| | | | | |
|---|---|---|---|---|
| EP | 0418851 | * | 3/1991 | H04Q/11/04 |
| GB | 2249927 | * | 5/1992 | H04J/3/02 |

* cited by examiner

*Primary Examiner*—Ricky Ngo
*Assistant Examiner*—Frank Duong

(57) ABSTRACT

A time slot interchanger (10) includes a D-channel processing device (30). The D-channel processing device (30) includes a main memory (32), a D-channel memory (34), and a D-channel assembler (36). The main memory (32) receives telephony data and signaling traffic from a subscriber in the form of integrated services digital network signals. Two-bit D-channel signaling portions of each integrated services digital network signals are extracted and placed into the D-channel memory (34). The D-channel assembler (36) assembles the two-bit D-channel signaling portions into eight-bit digital signal level zero (DS0) signals. The eight-bit DS0 signals are stored in the D-channel memory (34) for subsequent transfer with selected telephony data traffic from the main memory (32) over a synchronous optical network link.

7 Claims, 1 Drawing Sheet

APPARATUS AND METHOD OF PROCESSING SIGNALING BITS OF INTEGRATED SERVICES DIGITAL NETWORK SIGNALS

RELATED PATENT APPLICATION

This application claims the benefit of U.S. Provisional Application Ser. No. 60/032,064, filed on Nov. 29, 1996.

TECHNICAL FIELD OF THE INVENTION

The present invention relates in general to telecommunications signal processing and more particularly to an apparatus and method of processing signaling bits of integrated services digital network signals.

BACKGROUND OF THE INVENTION

Integrated services digital network signals typically comprise of two B-channel portions and one D-channel portion. Each B-channel portion has eight bits and the D-channel portion has two bits. The traditional base unit of transport of information within a telephony system is a digital signal level zero (DS0) signal that is eight bits in length. The DS0 signal is thus already capable of carrying intact B-channel portions. However, it typically requires a full DS0 signal to carry one D-channel portion. This situation results in a waste of three-fourths of the bandwidth of the DS0 signal. Therefore, it is desirable to maximize the use of DS0 signals when carrying D-channel portions of integrated services digital network signals.

SUMMARY OF THE INVENTION

From the foregoing, it may be appreciated that a need has arisen for a technique to efficiently process the signaling bits found within integrated services network signals. In accordance with the present invention, an apparatus and method of processing signaling bits of integrated services digital network signals are provided which substantially eliminate or reduce disadvantages and problems associated with conventional integrated services digital network signal processing.

According to an embodiment of the present invention, there is provided a method of processing signaling bits of integrated services digital network signals that includes receiving a plurality of integrated services digital network signals. The signaling bits of each integrated services digital network signal are extracted. The extracted signaling bits are assembled into a plurality of byte-wide sections.

The present invention provides various technical advantages over conventional integrated services digital network signal processing. For example, one technical advantage is the segregation of signaling bits from data bits carried by integrated services digital network signals. Another technical advantage is to establish a separate bus for the transport of signaling bits associated with integrated services digital network signals. Yet another technical advantage is to assemble and transfer D-channel signals over fully occupied DS0 signals. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
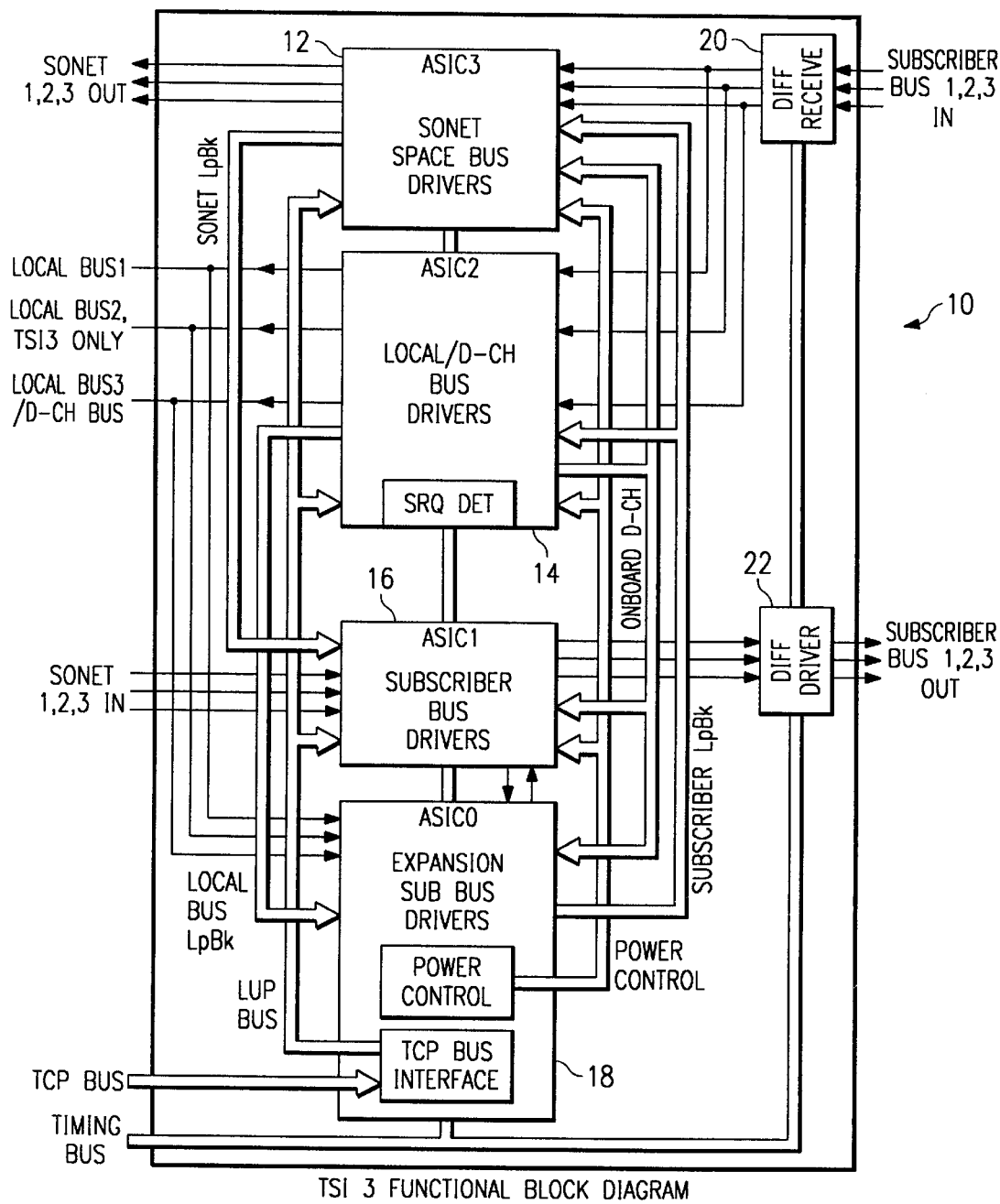
FIG. 1 illustrates a block diagram of a time slot interchanger.

FIG. 1 is a block diagram of a time slot interchanger 10. Time slot interchanger 10 includes a synchronous optical network (SONET) space bus driver 12, a local bus driver 14, a subscriber bus driver 16, and an expansion bus driver 18. The main function of time slot interchanger 10 is to provide connections between SONET links and subscribers. Time slot interchanger 10 achieves non-blocking digital signal level zero (DS0) switching between subscribers and SONET links by splitting the data flow into SONET link to subscriber and subscriber to SONET link directions.

SONET space bus driver 12 receives telephony traffic from subscribers via a differential receiver 20 for processing and delivery to a telecommunications network over a SONET link. Local bus driver 14 provides local buses to and from additional time slot interchangers 10 for communicating with all bus drivers. Local bus driver 14 may also use a local bus to perform D-channel signaling processing and transfer. Subscriber bus driver 16 receives telephony traffic from SONET links for processing and delivery to subscribers through a differential transmitter 22. Expansion bus driver 18 functions as an extension of subscriber bus driver 16. Expansion bus driver 18 also provides a terminal control processor interface for communicating with an external terminal control processor. A local microprocessor bus is driven by expansion bus driver 18 to communicate control and operational information throughout time slot interchanger 10. Expansion bus driver 18 drives a power control bus to communicate power control information to SONET space bus driver 12, local bus driver 14, and subscriber bus driver 16. A SONET loopback capability is available between SONET space bus driver 12 and subscriber bus driver 16.

Figure 2:
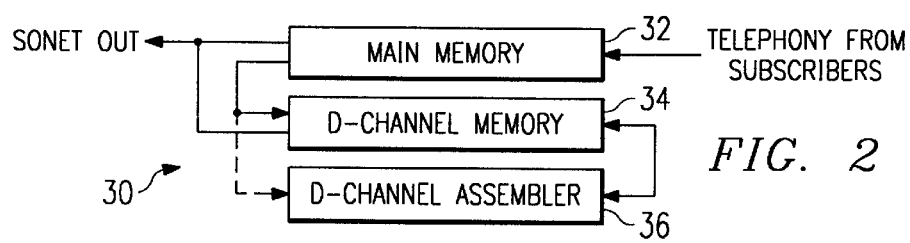
FIG. 2 illustrates a block diagram of an integrated services digital network signal processing device within the time slot interchanger.

FIG. 2 is a block diagram of a D-channel processing device 30 used within time slot interchanger 10. D-channel processing device 30 may be located on any of the bus drivers of time slot interchanger 10 are between bus drivers of time slot interchanger 10. D-channel processing device 30 includes a main memory 32, a D-channel memory 34, and a D-channel assembler 36. Main memory 32 receives subscriber information in the form of integrated services digital network signals during a first frame of data transfer. D-channel signals within the integrated services digital network signals are extracted from main memory 32 and sent over the D-channel bus to be stored in D-channel memory 34. During a second frame of data transfer, the D-channel signals are sent over the D-channel bus to D-channel assembler 36, where the D-channel signals are assembled into eight bit bytes. The eight bit bytes are stored in D-channel memory 34. During a third frame of data transfer, the eight bit bytes are sent as DS0 signals over the SONET link with the telephony traffic from main memory 32. Though shown as separate memories, main memory 32 and D-channel memory 34 may be part of a single memory space.

D-channel assembler 36 may receive two-bit D-channel signals directly from main memory 32. D-channel assembler 36 may place a two-bit D-channel signal into any bit positions of the eight bit assembled DS0 signal. In this manner, D-channel assembler 36 may generate DS0 signals that are filled with as few as one two-bit D-channel signal or filled with as many as four two-bit D-channel signals.

Thus, it is apparent that there has been provided, in accordance with the present invention, an apparatus and method of processing signaling bits of integrated services digital network signals that satisfy the advantages set forth above. Although the present invention has been described in detail, it should be understood that various changes, substitutions, and alterations readily ascertainable by those skilled in the art can be made without departing from the spirit and scope of the present invention as defined by the following claims.

What is claimed is:

1. A method of processing signaling bits of integrated services digital network signals, comprising steps of:
   receiving integrated services digital network signals;
   extracting signaling bits from each integrated services digital network signal;
   assembling signaling bits into byte sections, wherein the signaling bits from a particular group of integrated services digital network signals can be placed into any bit position of a particular byte section.

2. The method of claim 1, wherein integrated services digital network signals are received during a first frame, signaling bits being extracted and assembled during a second frame.

3. The method of claim 1, further comprising steps of:
   storing integrated services digital network signals into a first memory;
   storing byte sections into a second memory.

4. The method of claim 1, further comprising a step of:
   transmitting the byte sections as digital signal level zero signals.

5. The method of claim 4, wherein integrated services digital network signals are received with a first frame of information, signaling bits being extracted and assembled during receipt of a second frame of information, byte sections being transmitted during receipt of a third frame of information.

6. The method of claim 1, wherein the assembling step includes shifting signaling bits into particular bit positions of eight bit byte sections.

7. An apparatus for processing signaling bits of integrated services digital network signals, comprising:
   a main memory operable to receive a plurality of integrated services digital network signals;
   a D-channel memory operable to receive D-channel signaling portions from each of the plurality of integrated services digital network signals;
   a D-channel assembler operable to place a plurality of D-channel signaling portions into a digital signal level zero signal, wherein the D-channel assembler is operable to place a particular group of D-channel signaling portions into any bit position of the digital signal level zero signal.

* * * * *